US009021900B2

(12) United States Patent
Yang et al.

(10) Patent No.: US 9,021,900 B2
(45) Date of Patent: May 5, 2015

(54) IN-PIPE INSPECTION ROBOT

(75) Inventors: Hyun Seok Yang, Seoul (KR); Woong Sun Jeon, Suwon-si (KR)

(73) Assignee: Industry-Academic Cooperation Foundation Yonsei University, Seoul (KR)

( * ) Notice: Subject to any disclaimer, the term of this patent is extended or adjusted under 35 U.S.C. 154(b) by 327 days.

(21) Appl. No.: 13/605,667

(22) Filed: Sep. 6, 2012

(65) Prior Publication Data

US 2013/0104676 A1 May 2, 2013

(30) Foreign Application Priority Data

Nov. 2, 2011 (KR) .................. 10-2011-0113152

(51) Int. Cl.
*F16L 55/34* (2006.01)
*B25J 9/04* (2006.01)
*B25J 9/06* (2006.01)
*B25J 9/12* (2006.01)
*F16L 101/30* (2006.01)
*B25J 9/00* (2006.01)
*B25J 9/10* (2006.01)

(52) U.S. Cl.
CPC ............ *F16L 55/34* (2013.01); *B25J 9/126* (2013.01); *B25J 9/04* (2013.01); *B25J 9/0087* (2013.01); *F16L 2101/30* (2013.01); *B25J 9/009* (2013.01); *B25J 9/102* (2013.01); *B25J 9/06* (2013.01); *Y10S 901/01* (2013.01); *Y10S 901/19* (2013.01); *Y10S 901/23* (2013.01); *Y10S 901/26* (2013.01); *Y10S 901/27* (2013.01); *Y10S 901/30* (2013.01); *Y10S 901/44* (2013.01)

(58) Field of Classification Search
CPC ............ B25J 9/0087; B25J 9/009; B25J 9/04; B25J 9/045; B25J 9/06; B25J 9/065; B25J 9/102; B25J 9/1035; B25J 9/126; F16L 55/34; F16L 2101/30
See application file for complete search history.

(56) References Cited

U.S. PATENT DOCUMENTS

| 4,945,775 | A | * | 8/1990 | Adams et al. ................. 73/865.8 |
| 6,035,786 | A | * | 3/2000 | McKay et al. ......... 104/138.2 X |
| 6,278,903 | B1 | * | 8/2001 | Iwasaki et al. ................. 700/245 |
| 6,450,104 | B1 | * | 9/2002 | Grant et al. ................. 104/138.2 |
| 6,887,014 | B2 | * | 5/2005 | Holland ................. 104/138.2 X |
| 6,917,176 | B2 | * | 7/2005 | Schempf et al. ............ 901/44 X |

(Continued)

FOREIGN PATENT DOCUMENTS

| CN | 201427125 Y | * | 3/2010 | ............. F16L 55/32 |
| CN | 102644831 A | * | 8/2012 | ............. F16L 55/32 |

(Continued)

OTHER PUBLICATIONS

KIPO Notice of Allowance mailed Apr. 1, 2013 for Korean Patent Application No. 10-2011-0113152 which corresponds to the above-identified application, in Korean.

*Primary Examiner* — Thomas P Noland
(74) *Attorney, Agent, or Firm* — LRK Patent Law Firm

(57) ABSTRACT

Provided is an in-pipe inspection robot which moves along a path in a pipe to inspect suspected areas such as cracks in the pipe. An in-pipe inspection robot in accordance with an exemplary embodiment of the present invention has a configuration in which two or more operating units having a plurality of arms, which move forward and backward in a radial direction of a pipe, are connected to each other to move in a straight direction or to be bent relative to each other by means of a flexible link mechanism.

13 Claims, 12 Drawing Sheets

(56) References Cited

U.S. PATENT DOCUMENTS

| | | | |
|---|---|---|---|
| 7,717,003 B2 * | 5/2010 | Munz .......................... 73/865.8 |
| 2003/0039752 A1 * | 2/2003 | Winiewicz et al. ........... 427/236 |
| 2003/0150351 A1 * | 8/2003 | Salvi Dos Reis .......... 104/138.2 |
| 2004/0099175 A1 * | 5/2004 | Perrot et al. ........ F16L 2101/30 |
| 2006/0070775 A1 * | 4/2006 | Anhalt et al. ............ B25J 9/065 |
| 2008/0072963 A1 * | 3/2008 | Strohmeier et al. F16L 2101/30 |
| 2010/0308810 A1 * | 12/2010 | Gibson et al. ....... F16L 2101/30 |

FOREIGN PATENT DOCUMENTS

| | | | | | |
|---|---|---|---|---|---|
| DE | 10215325 A1 | * | 10/2003 | .............. F16L 55/32 |
| EP | 0836694 B1 | * | 1/2002 | .............. F16L 55/34 |
| JP | 03208765 A | * | 9/1991 | ................. 104/138.2 |
| JP | 04093188 A | * | 3/1992 | ..................... 901/44 |
| KR | 20000032678 A | * | 6/2000 | ................. B25J 5/00 |
| KR | 10-2003-0035594 A | | 5/2003 | |
| KR | 10-2007-0005479 A | | 1/2007 | |
| KR | 10-2010-0094824 A | | 8/2010 | |

* cited by examiner (a)

(b)

(c)

(d)

(e)

(f)

(g)

IN-PIPE INSPECTION ROBOT

CROSS-REFERENCE TO RELATED PATENT APPLICATION

This application claims the benefit of Korean Patent Application No. 10-2011-0113152, filed on Nov. 2, 2011, in the Korean Intellectual Property Office, the disclosure of which is incorporated herein in its entirety by reference.

BACKGROUND OF THE INVENTION

1. Field of the Invention

The present invention relates to an in-pipe inspection robot and, more particularly, to an in-pipe inspection robot, which is inserted into a pipe, to which it is difficult for a worker to gain direct access, and freely moves in the pipe to inspect any damage to a wall of the pipe, any misalignment of a pipe joint, etc.

2. Description of the Related Art

Pipelines buried underground to make water and sewage pipes, electrical lines, communication lines, etc. deteriorate as time passes after construction and require repair or replacement. In particular, in the case of a pipeline where electrical lines or communication lines are wired, it is necessary to replace the electrical lines or communication lines with new ones when their durability reaches zero. However, when a wall of the pipeline is damaged or joint of the pipeline is misaligned, it is difficult to insert the new lines, and thus it is necessary to repair the damaged pipeline before the insertion of the lines.

As a method of repairing the pipeline, a conventional trench repair method has many problems. That is, it is costly and time-consuming to excavate and repave the ground under which pipelines are buried, and during the construction, traffic jam occurs around the construction site, and contamination occurs due to soil and dust. Accordingly, a trench less method of inspecting suspected areas in the pipeline by inserting a robot into the pipeline without excavating the ground has recently been used.

A typical robot used in the trenchless method includes a wheel-type robot disclosed in Korean Patent Publication No. 2010-0094824 and a robot having a structure in which a camera, a repair tool, etc, are mounted on a body provided with a caterpillar crawler, but no concrete examples were given. This type of robot is controlled by an external control unit to move to photograph the internal state of the pipeline, transmit images, and repair damaged areas found, thus performing repair operations.

However, the above-described conventional wheel-type or caterpillar crawler-type in-pipe inspection robots are suitable for the inspection of pipelines which are buried horizontally but cannot run in a pipeline which is installed vertically or obliquely. To solve this problem, a robot based on an inchworm motion has been proposed. However, the conventional inchworm-type robot is difficult to move in a pipeline with curved sections such as curves, T-shaped, Y-shaped branches, etc., and thus its use is limited.

PRIOR ART LITERATURE

Patent Literature: Korean Patent Publication No. 2010-0094824

SUMMARY OF THE INVENTION

The present invention has been made in an effort to solve the above-described problems associated with prior art, and an object of the present invention is to provide an in-pipe inspection robot, which is based on an inchworm motion that can freely move in a pipeline installed vertically or obliquely and in a pipeline with curved sections such as curves, T-shaped, Y-shaped branches, etc.

To achieve the above objects the present invention provides an in-pipe inspection robot which can move along a path in a pipe, characterized in that two or more operating units having a plurality of arms, which move forward and backward in a radial direction of the pipe, are connected to each other to move in a straight direction or to be bent relative to each other by means of a flexible link mechanism.

Here, the plurality of arms provided on the same operating unit may move the same length in the radial direction of the pipe at the same time and the arms provided on different operating units may have mutually independent movements.

Moreover, each of the operating units for moving the plurality of arms at the same time may comprise a slider-crank mechanism, which includes a crank rotating with respect to a power transfer unit provided in the middle and a plurality of links bendably connected to ends of the crank and corresponding to the number of arms, such that when the crank rotates, each of the arms reciprocates along a slide shaft by each of the links and moves forward and backward in the radial direction of the pipe at the same time.

Each of the plurality of arms may comprise a foot for contact with a wall in the pipe and an elastic unit provided with an elastic body in the middle thereof for elastic pressure to the wall in the pipe.

In an exemplary embodiment, the flexible link mechanism may be rotatably connected to any one of the operating units with respect to a rotation axis along the longitudinal direction of the robot.

In detail, the flexible link mechanism may comprise an actuator, a flexible link made of a flexible material having a predetermined length, whose movement length is controlled by the actuator, and a mover spaced from the actuator and mounted on one free end of the flexible link.

Here, the flexible link may be connected to the actuator in a rack & pinion manner such that the movement length of the flexible link is controlled.

In particular, the flexible link may comprise a pair of parallel left flexible links and a pair of right flexible links opposite to the left flexible links, the left flexible links and the right flexible links having mutually independent movements by two drive motors provided separately.

Preferably, the flexible ink may be an elastic bar made of a flexible material such as urethane.

Moreover, the actuator may comprise two independent drive motors, and an electrically-driven unit transmitting the rotational power of the drive motors to the pair of left flexible links and the pair of right flexible links, respectively, as linear power.

Here, the electrically-driven unit may comprise two independent left and right driven shafts which are each electrically connected to an output shaft of each of the drive motors, a pair of rack gears which are mounted on both ends of each of the driven shafts and transmit the rotational power each of the drive motors, transmitted to the driven shafts, to the pair of left flexible links or the pair of right flexible links, and a bracket which rotatably supports the left and right driven shafts having the rack gears.

In this exemplary embodiment, the output shaft of each of the drive motors and the driven shaft of the electrically-driven unit are arranged to cross each other and electrically connected to each other by a pair of bevel gears.

Moreover, the bracket may further comprise a tensioner which is configured such that the pairs of left and right flexible links are not separated but in close contact with the corresponding rack gears in the engagement direction.

In this case, the tensioner may comprise a pair of spaced adjustment blocks which are connected to both ends of the bracket by means of an adjustment member so as to adjust the distance to the end cy the bracket, a support shaft, of which both ends are supported on the adjustment blocks, and a roller which is rotatably mounted on the support shaft in a position that is in close contact with each flexible link.

Moreover, the mover may comprise a plurality of holders, to which one free end of the flexible link is fixed, and a rotating means which is provided on a body having the holders to implement the rotation of the operating unit with respect to the mover.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the accompanying drawings.

Figure 1:
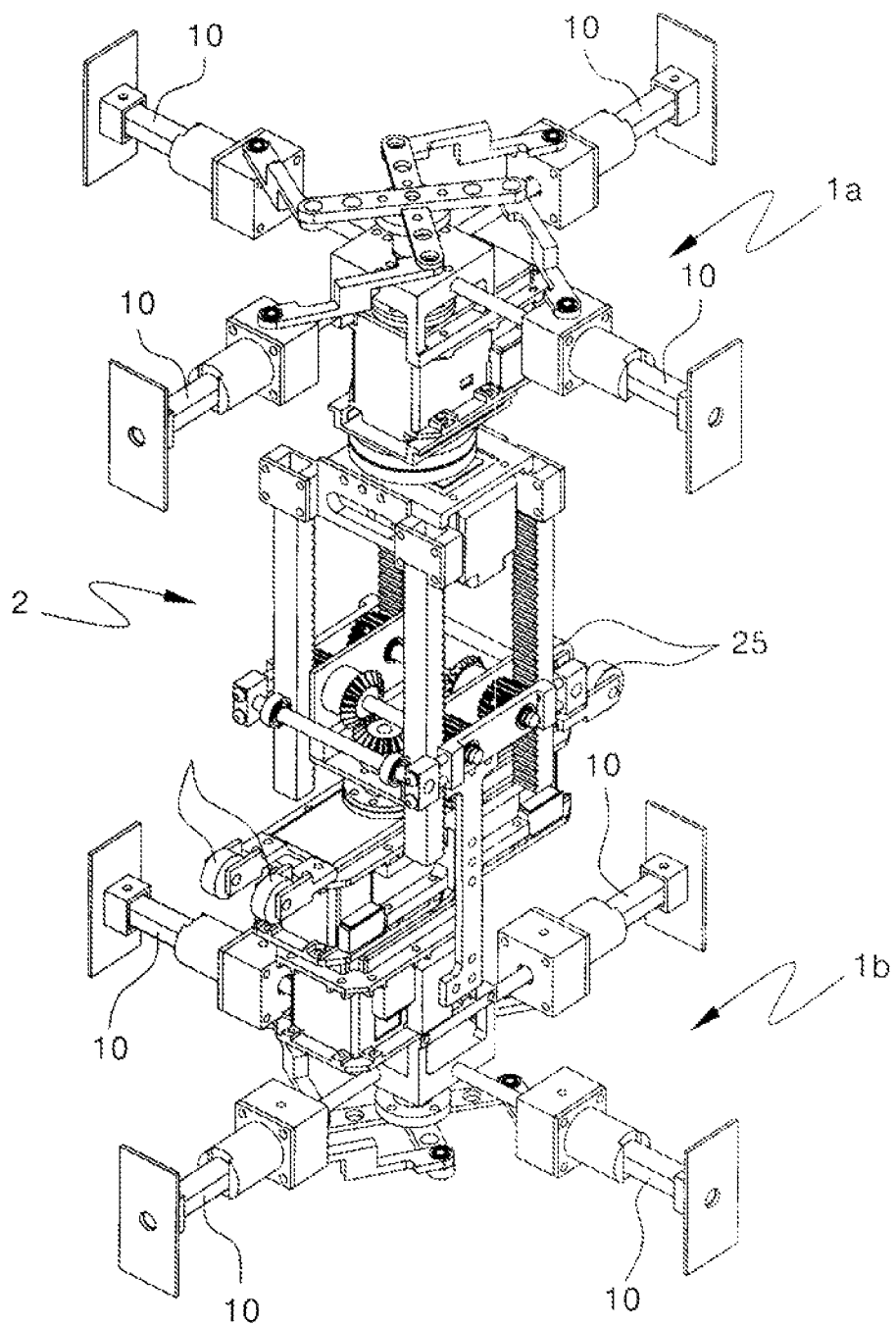
FIG. 1 is a perspective view of an in-pipe inspection robot in accordance with an exemplary embodiment of the present invention.
Figure 2:
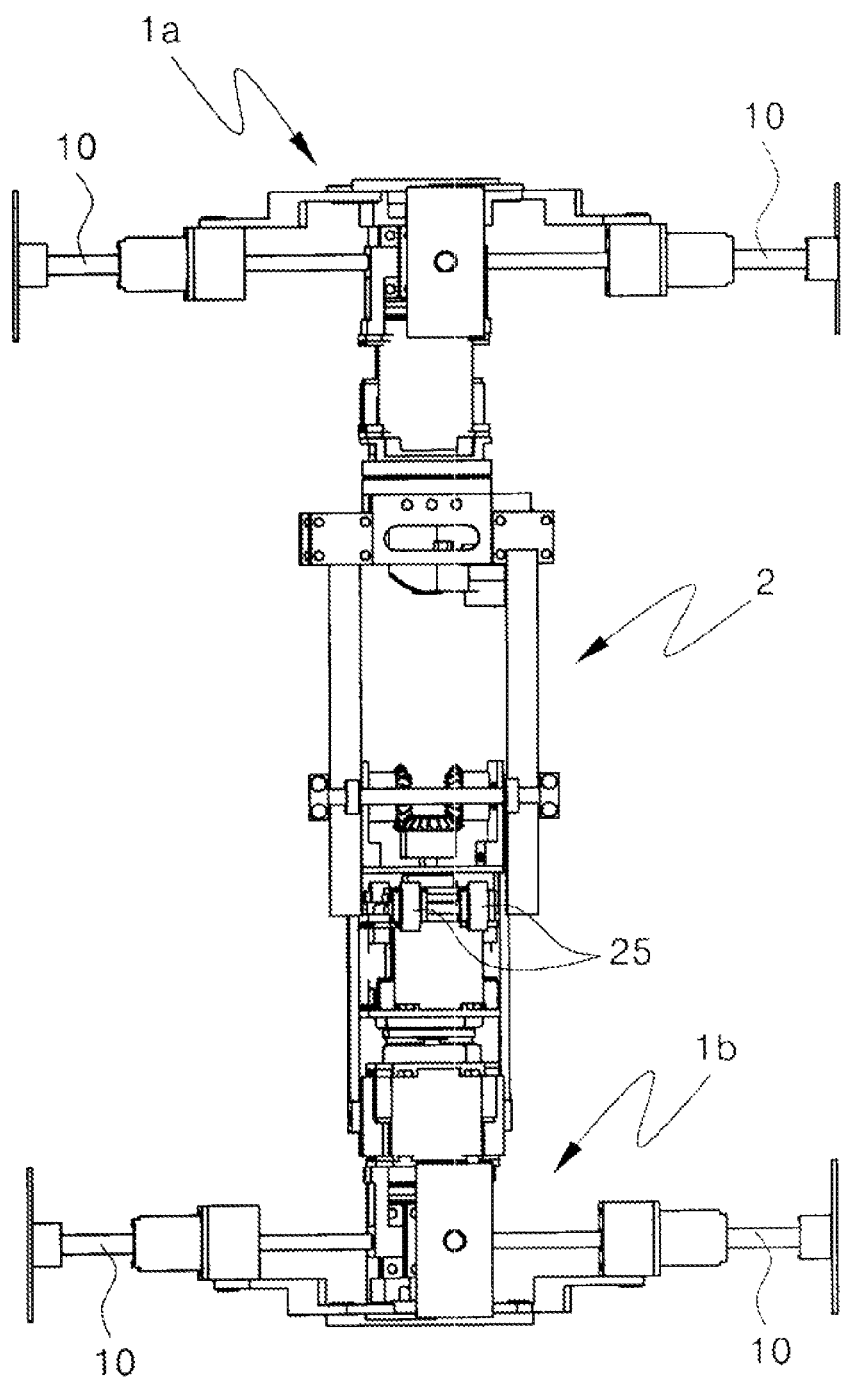
FIG. 2 is a front view of the in-pipe inspection robot shown in FIG. 1.
Figure 3:
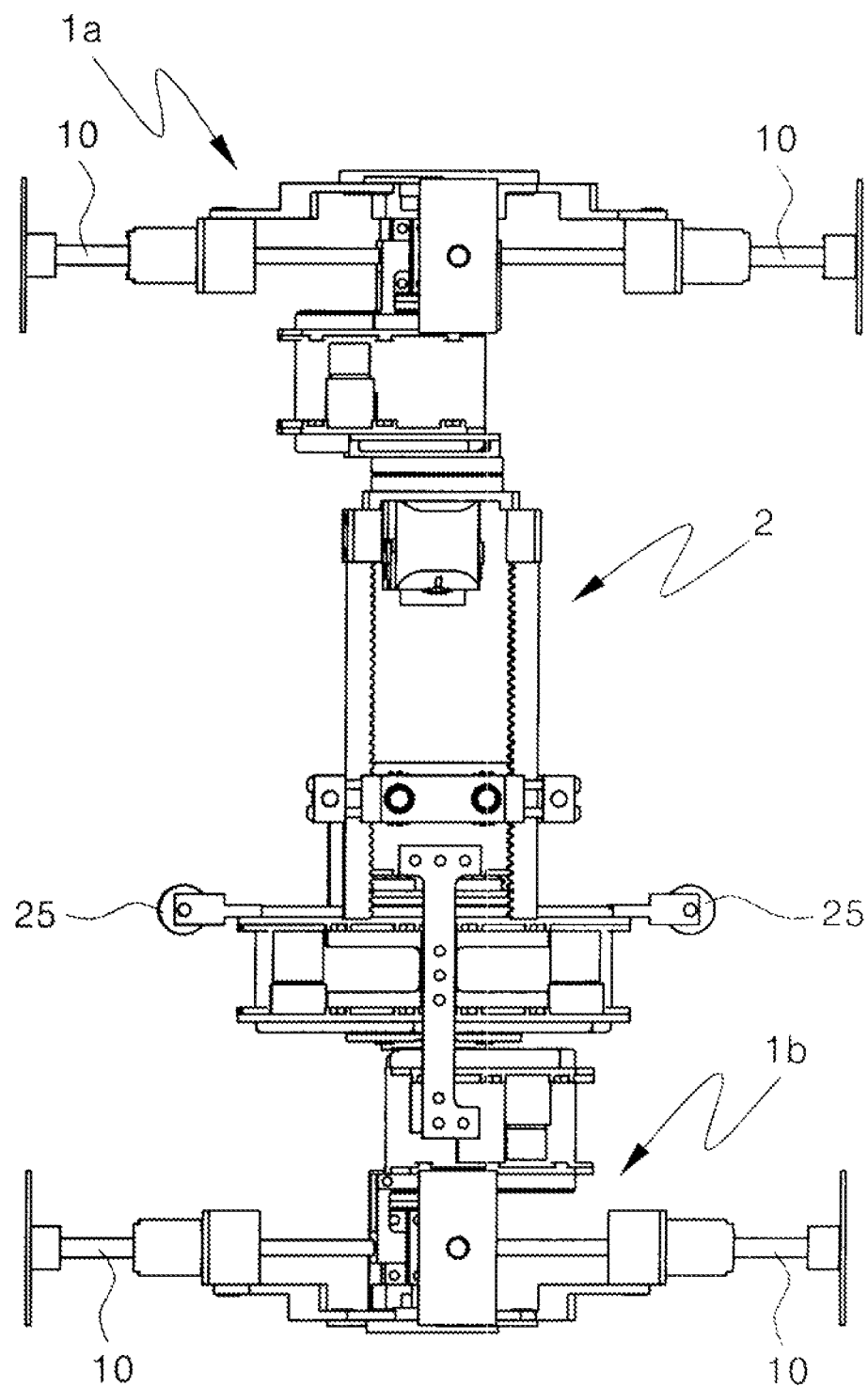
FIG. 3 is a side view of the in-pipe inspection robot shown in FIG. 1.

FIG. 1 is a perspective view of an in-pipe inspection robot in accordance with an exemplary embodiment of the present invention, FIG. 2 is a front view of the in-pipe inspection robot shown in FIG. 1, and FIG. 3 is a side view of the in-pipe inspection robot shown in FIG. 1. The overall configuration of the in-pipe inspection robot in accordance with an exemplary embodiment of the present invention will be described with reference to these drawings.

Referring to FIGS. 1 to 3, the in-pipe inspection robot in accordance with an exemplary embodiment of the present invention comprises two independent operating units 1a and 1b and a flexible link mechanism 2 which connects the two operating units 1a and 1b to be relatively moved. Each of the operating units 1a and 1b has a plurality of arms 10 which move forward and backward in a radial direction of a pipe to pressure the inner side of the pipe, and the flexible link mechanism 2 allows the operating units 1a and 1b to move toward and away from each other and to be bent relative to each other.

The plurality of arms 10 provided on the same operating units 1a and 1b move the same length in the radial direction of the pipe, and the arms 10 provided on different operating units 1a and 1b have mutually independent movements. Accordingly, the in-pipe inspection robot of the present invention can be stably fixed to the inner side of the pipe due to the movement of the arms 10, like open arms. Moreover, the in-pipe inspection robot of the present invention can freely move in the pipe, just as an inchworm moves, due to the sequential movement of the arms 10 of each of the operating units 1a and 1b and the forward and backward movement and bending of the flexible link mechanism 2.

Figure 4:
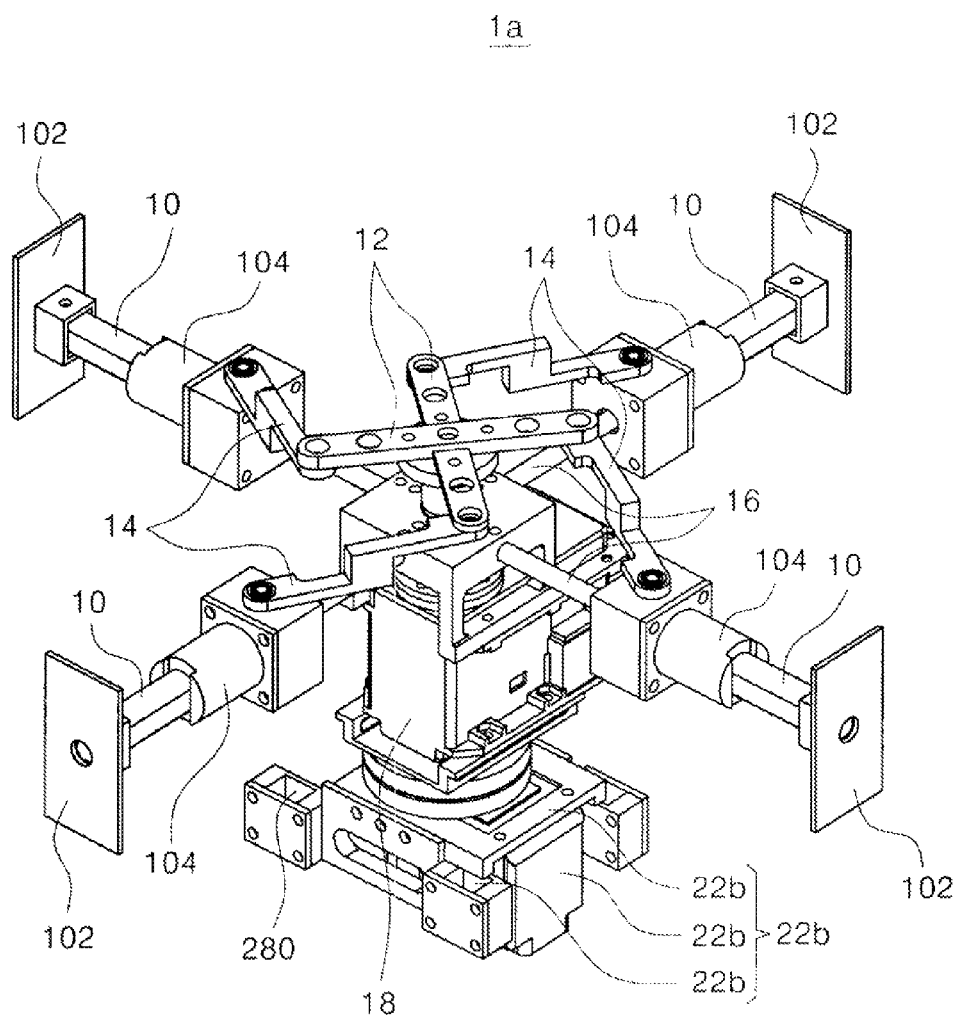
FIG. 4 is a perspective view showing the configuration of an operating unit of FIG. 1.
Figure 5:
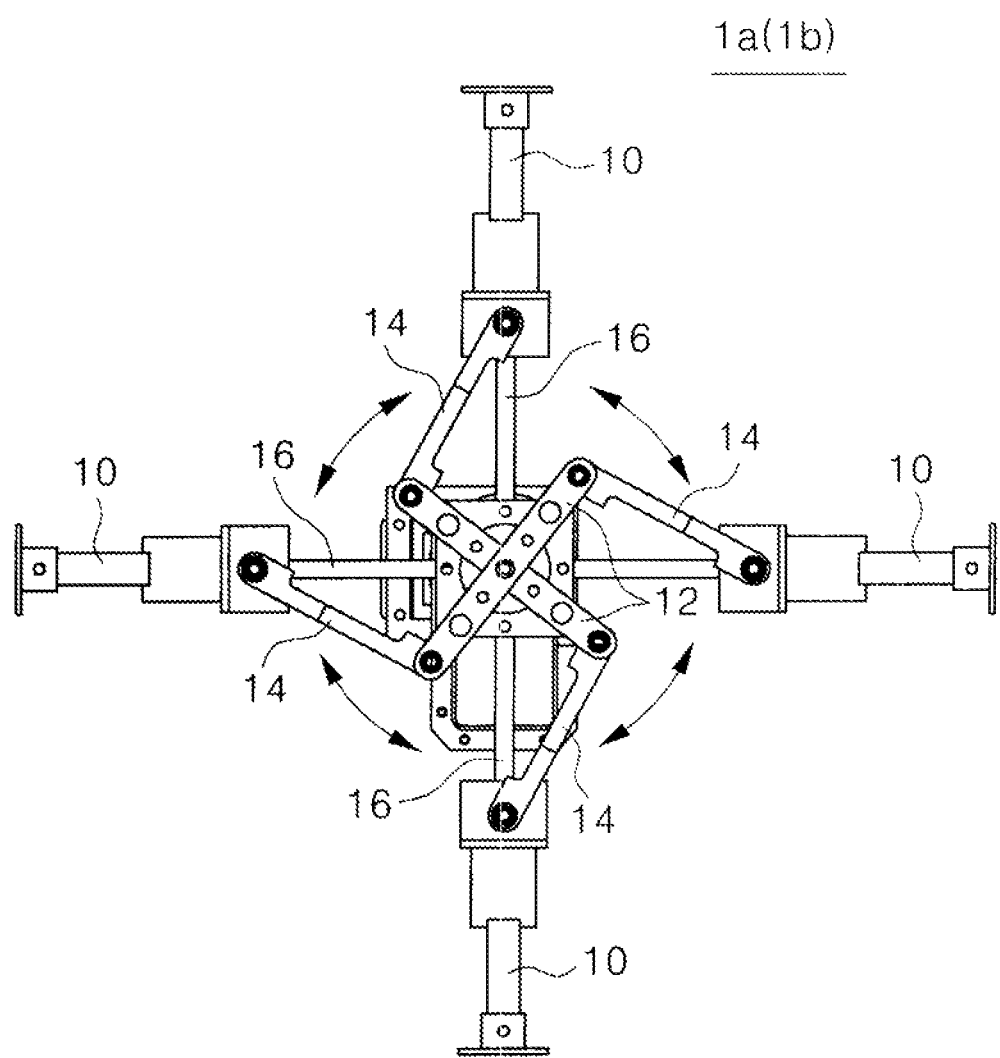
FIG. 5 is a plan view of the operating unit of FIG. 4.
Figure 6:
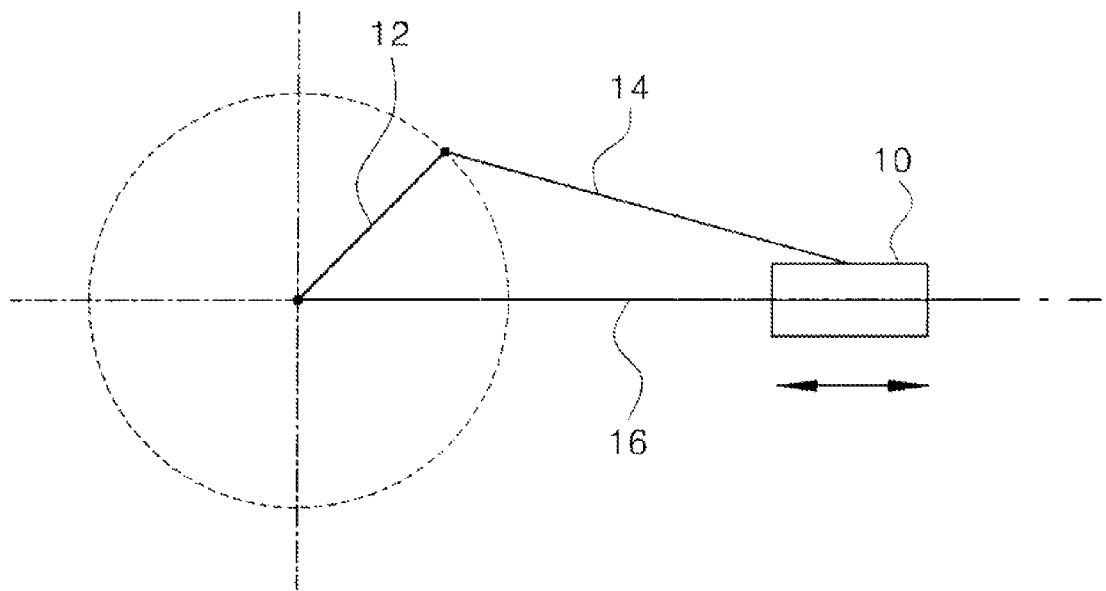
FIG. 6 is a conceptual view showing the operation principle of the operating unit of FIG. 5.

FIG. 4 is a perspective view showing the configuration of the operating unit of FIG. 1, FIG. 5 is a plan view of the operating unit of FIG. 4, and FIG. 6 is a conceptual view showing the operation principle of the operating unit of FIG. 5.

Referring to FIGS. 4 to 6, for the simultaneous movement of the plurality of arms 10 provided in each of the operating units 1a and 1b, each of the operating units 1a and 1b may comprise a slider-crank mechanism, which includes a crank 12 rotating with respect to a power transfer unit (not labeled) provided in the middle and a plurality of links 14 bendably connected to ends of the crank 12 and corresponding to the number of arms 10, such that when the crank 12 rotates, each of the arms 10 reciprocates along a slide shaft 16 by each of the links 14 and moves forward and backward in the radial direction of the pipe at the same time.

However, the present invention is not limited to the slider-crank mechanism as shown in the drawings and may employ various mechanisms such as hydraulic or pneumatic mechanisms, which can allow the arms to freely move, without regard to any specific structure and form.

The power transfer unit of each of the operating units 1a and 1b receives power from a driving unit 18 equipped with a motor disposed at the bottom thereof and is driven forwardly and reversely within a predetermined angle range. As shown in FIGS. 1 to 3, out of the two operating units 1a and 1b, the operating unit 1a located at the top is rotatably connected to the flexible link mechanism 2 with respect to the rotation axis along the longitudinal direction of the robot and thus can rotate 360 degrees with respect to the flexible link mechanism 2.

In detail, a mover 28, which will be described later, of the flexible link mechanism 2 is rotatably connected to the bottom of the operating unit 1a located at the top, and thus the operating unit 1a located at the top can rotate 360 degrees with respect to the mover 28.

Figure 7:
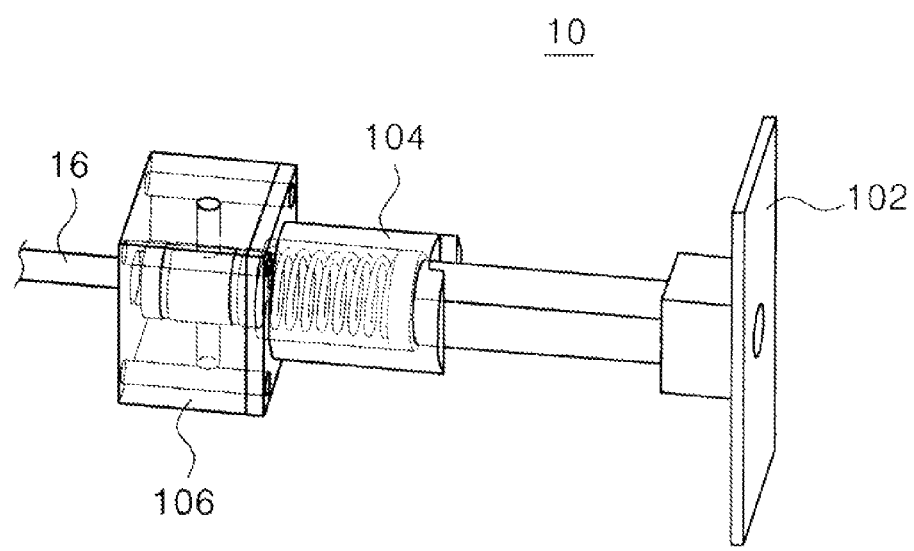
FIG. 7 is an exploded perspective view of an arm of the operating unit.

Each of the arms 10, which move forward and backward in the radial direction of the pipe by the slider-crank mechanism, includes a foot 102 for contact with a wall in the pipe and an elastic unit 104 provided with an elastic body, e.g., a compression spring, in the middle thereof for elastic pressure to the wall in the pipe as shown in FIG. 7. An end of the link 14 is connected to the rear of the elastic unit 104, and the arm 10 includes a slide block 106 through which the slide shaft 16 penetrates.

Figure 8:
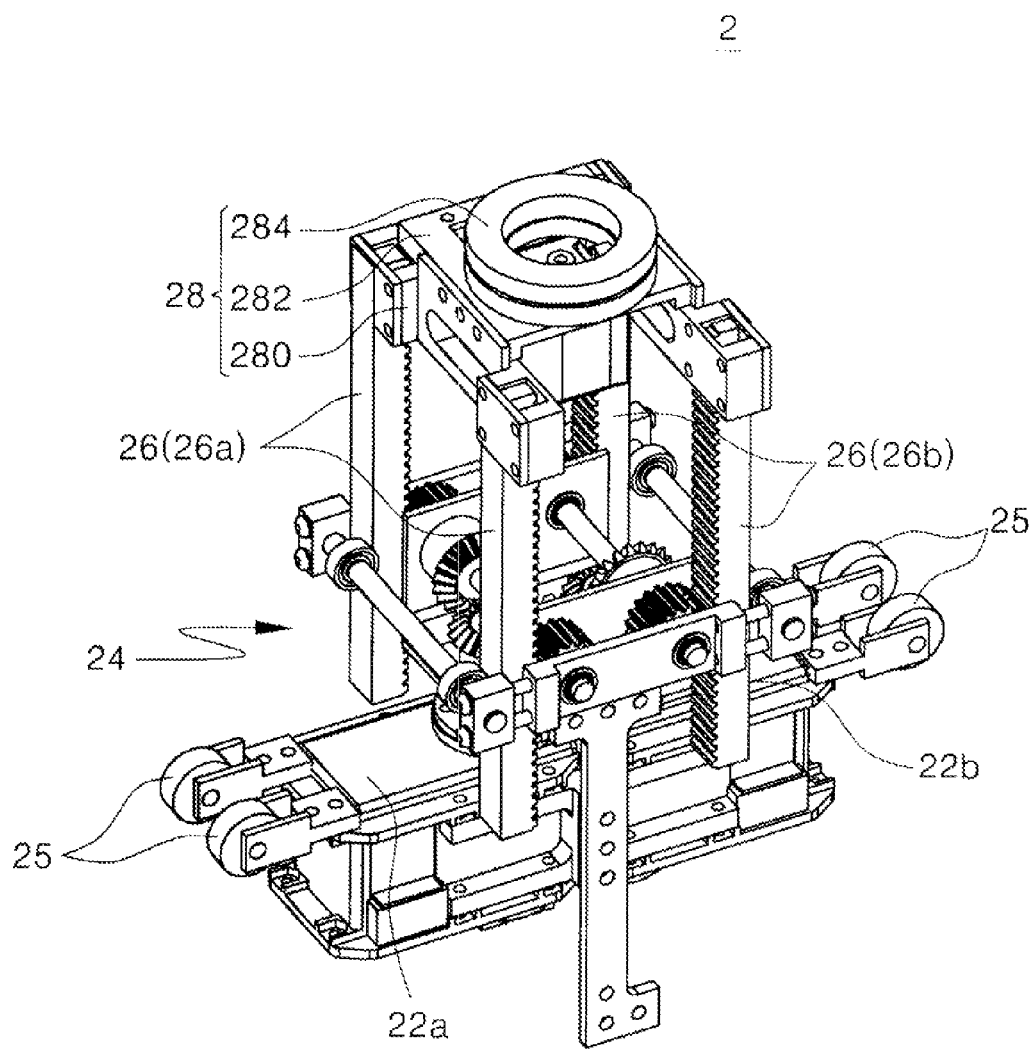
FIG. 8 is a perspective view showing the configuration of a flexible link mechanism of FIG. 1.
Figure 9:
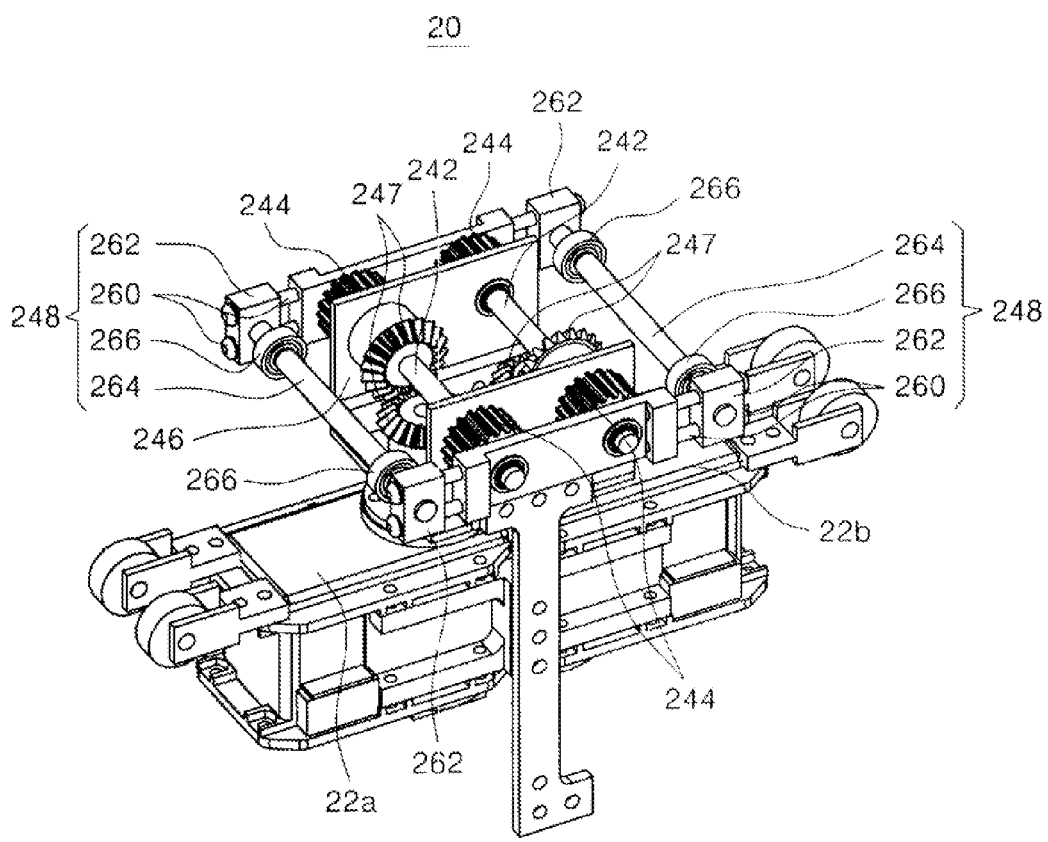
FIG. 9 is a perspective view of an actuator of the flexible link mechanism of FIG. 8.
Figure 10:
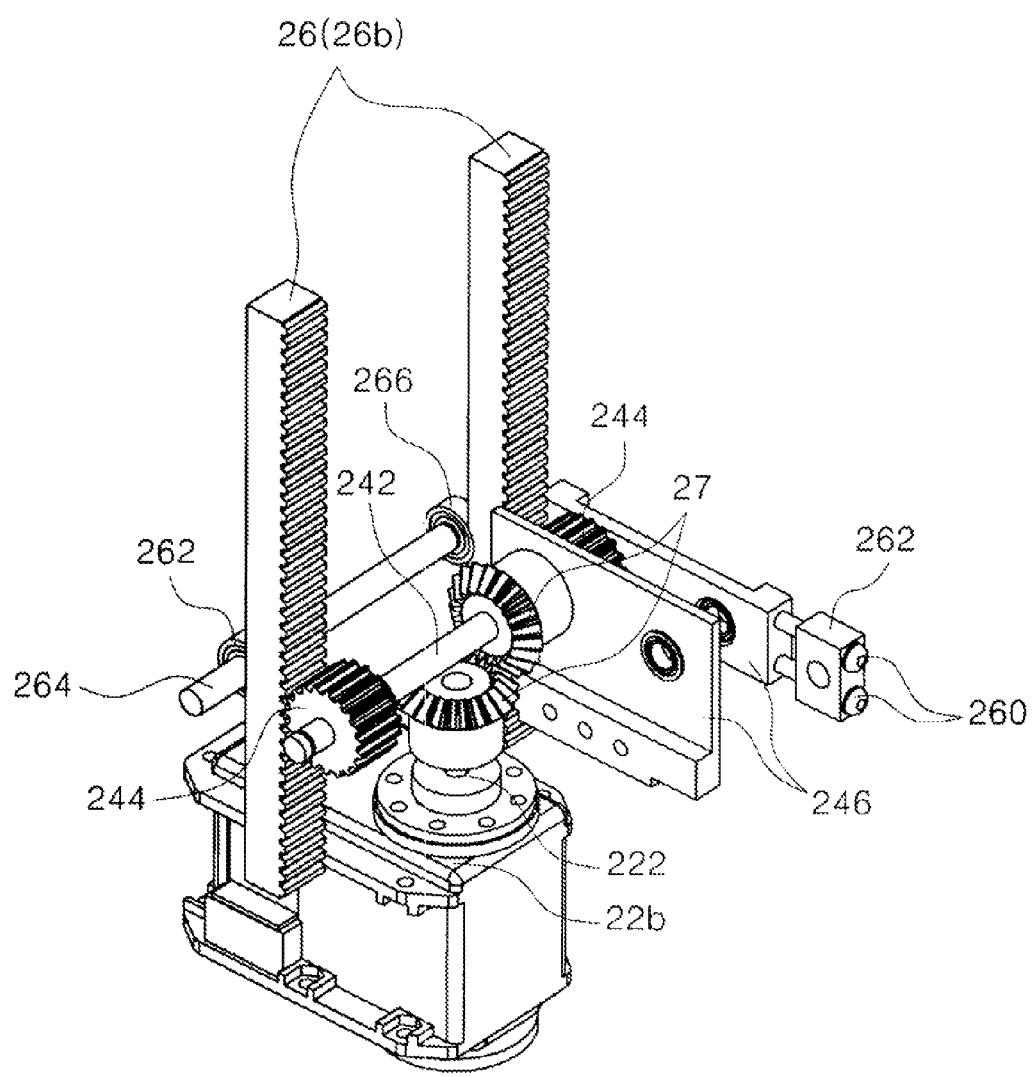
FIG. 10 is a perspective view showing in more detail the configuration of the actuator of FIG. 9.

The flexible link mechanism 2 allows the two operating units 1a and 1b to move toward and away from each other and allows one operating unit 1a to be located at a bent angle with respect to the other operating unit 1b. The flexible link mechanism 2 may have a structure comprising an actuator 20, a flexible link 26, and the mover 28, as shown in FIGS. 8 to 10. The flexible link mechanism 2 will now be described in more detail with reference to FIGS. 8 to 10.

FIG. 8 is a perspective view showing the configuration of the flexible link mechanism of FIG. 1, FIG. 9 is a perspective view of an actuator of the flexible link mechanism of FIG. 8, and FIG. 10 is a perspective view showing in more detail the configuration of the actuator of FIG. 9.

Referring to FIGS. 8 to 10, the flexible link 26 may be an elastic bar made of a flexible material, e.g., urethane, in the form of a bar having a predetermined length. As shown in the figures, the flexible link 26 is connected to the actuator 20 in a rack & pinion manner such that the movement length of the flexible link 26 can be controlled. To this end, cogs connected to rack gears 244 may be formed on one side of the flexible link 26.

As shown in the figures, the flexible link 26 may comprise a pair of parallel left flexible links 26a and a pair of right flexible links 26b opposite to the left flexible links 26a. The left flexible links 26a and the right flexible links 26b have mutually independent movements by two drive motors 22a and 22b, and the movement lengths of the left flexible links 26a and the right flexible links 26b can be controlled by the corresponding drive motors 22a and 22b at the same time.

Accordingly, through the operation of the actuator 20 which moves both the left flexible links 26a and the right flexible links 26b at the same time or selectively moves either the left flexible links 26a or the right flexible links 26b, the in-pipe inspection robot of the present invention can freely move along curved sections at various angles and branched sections as well as straight sections in the pipe, thus implementing various inchworm motions. These motions will be described in more detail in the description of the operation later.

While the configuration comprising a total of four flexible links including the pair of left flexible links 26a and the pair of right flexible links 26b is shown in the drawings, the present invention is not limited thereto. That is, a flexible link having a rectangular cross-section may be provided on the left and right sides, respectively, and the movement length of each flexible link may be independently controlled by each of the drive motors 22a and 22b. Thus, although not shown in detail, such a modification may be included in the scope of the present invention.

The actuator 20, which controls the movement length of the flexible link 26, comprises two independent drive motors 22a and 22b and an electrically-driven unit 24 which transmits the rotational power of the drive motors 22a and 22b to the pair of left flexible links 26a and the pair of right flexible links 26b, respectively, as linear power (see FIG. 9). Moreover, a plurality of driving wheels 25, which selectively guide the movement in the pipe based on the movement of the arms 10 while being in contact with the surface of the pipe, extend to the side of a housing (not labeled) accommodating the driving motors and are exposed to the outside.

As shown in the figures, the electrically-driven unit 24 comprises two independent left and right driven shafts 242, which are electrically connected to output shafts 222 of the drive motors 22a and 22b, a pair of rack gears 244, which are mounted on both ends of each of the driven shafts 242 and transmit the rotational power of the drive motors 22a and 22b, transmitted to the driven shafts 242, to the pairs of left and right flexible links 26a and 26b, respectively, and a bracket 246 which rotatably supports the left and right driven shafts 242 having the rack gears 244.

The output shaft 222 of each of the drive motors 22a and 22b and the driven shaft 242 of the electrically-driven unit 24 are structurally arranged to cross each other, and the two shafts crossing each other are electrically connected to each other by a pair of bevel gears 247. Moreover, a tensioner 248 is installed on the bracket 246 such that the pairs of left and right flexible links 26a and 26b are not separated but in close contact with the corresponding rack gears 244 in the engagement direction.

As shown in FIGS. 8 to 10, the tensioner 248 may comprise a pair of spaced adjustment blocks 262, which are connected to both ends of the bracket 246 by means of an adjustment member 260, e.g., a bolt, etc., so as to adjust the distance to the end of the bracket 246, a support shaft 264, of which both ends are supported on the adjustment blocks 262, and a roller 266, which is rotatably mounted on the support shaft 264 in a position that is in close contact with each flexible link 26.

Meanwhile, the mover 28 comprises a plurality of holders 280 to which one free end of the flexible link 26 is fixed. Moreover, a rotating means 284 which implements the 360 degree rotation of the operating unit 1a with respect to the mover 28 based on one straight shaft penetrating the center of the mover 28 and the operating unit 1a in the longitudinal direction, is provided on a body 282 having the holders 280 on the outside thereof. As the rotating means, a motor, for example, may be employed, but not limited thereto.

As such, when the 360 degree rotation of the operating unit 1a with respect to the mover 28, which is implemented as the operating unit 1a is rotatably mounted on the mover 28, the selective movement of the left flexible links 26a and the right flexible links 26b, which is implemented by the actuator 20, and the movement of the arms 10 are combined, various motions that can freely move in the pipe, which is continuously curved at various angles and directions, can be implemented.

Various motions for the movement in the pipe, which can be performed by the in-pipe inspection robot in accordance with the exemplary embodiment of the present invention having the above-described configuration, will now be described. For convenience of the description, the two operating units, which constitute the in-pipe inspection robot of the present invention, will be referred to as a first operating unit and a second operation unit, respectively.

First, the linear movement in the pipe of the robot according to the present invention will be described with reference to FIGS. 11 and 13.

Figure 11:
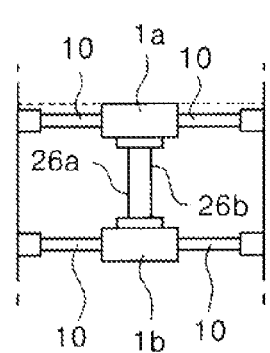
FIG. 11 is a view showing the operations based on linear movement in a pipe of the in-pipe inspection robot.
Figure 11:
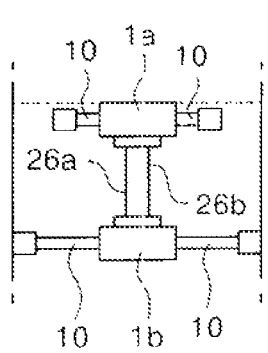
Figure 11:
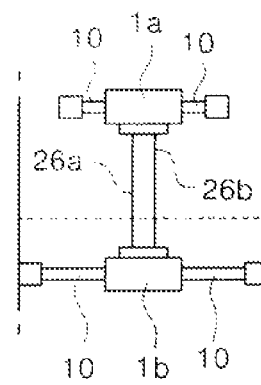
Figure 11:
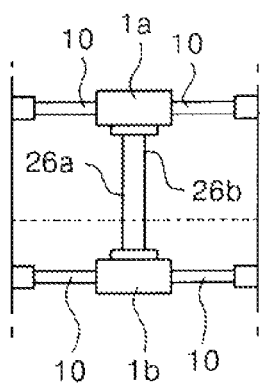
Figure 11:
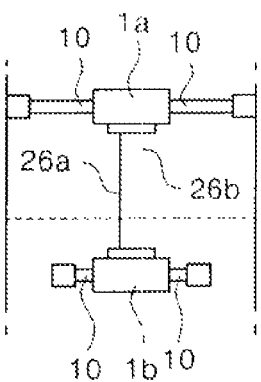
Figure 11:
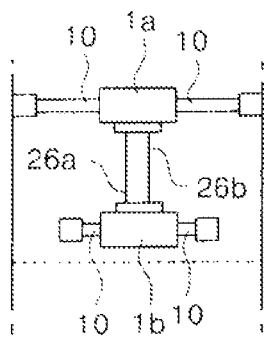
Figure 11:
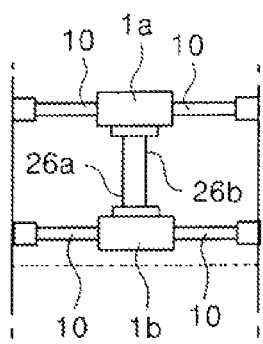

(a) of FIG. 11 shows that in a state where the in-pipe inspection robot according to the present invention enters the inside of a pipe, the arms 10 provided on the two operating units 1a and 1b are opened to pressure the inner side of the pipe, and thus the robot is fixed to the inside of the pipe. In this state, to implement the linear movement, as shown in (b), the arms 10 of the first operating unit 1a are closed to release the pressure of the first operating unit 1a with respect to the inner side of the pipe.

Next, as shown in (c), the left and right flexible links 26a and 26b of the flexible link mechanism 2 are moved at the same time with respect to the second operating unit 1b fixed to the inside of the pipe such that the first operating unit 1a is located at a predetermined position in the pipe that is spaced by the movement length of the flexible links from the second operating unit 1b and, in this state, the arms 10 of the first operating unit 1a are opened to pressure the inner side of the pipe at the corresponding position such that the two operating units are all fixed to the inner side of the pipe as shown in (d).

Then, as shown in (e), the arms 10 of the second operating unit 1b are closed to release the pressure of the second operating unit 1b with respect to the inner side of the pipe, and then the second operating unit 1b is moved toward the first operating unit 1a by returning the moved flexible links 26a and 26b to the original position with respect to the first operating unit 1a fixed to the inner side of the pipe as shown in (f). When the arms 10 of the second operating unit 1b moved toward the first operating unit 1a are opened as shown in (g), the step for the linear movement in the pipe is completed.

Figure 12:
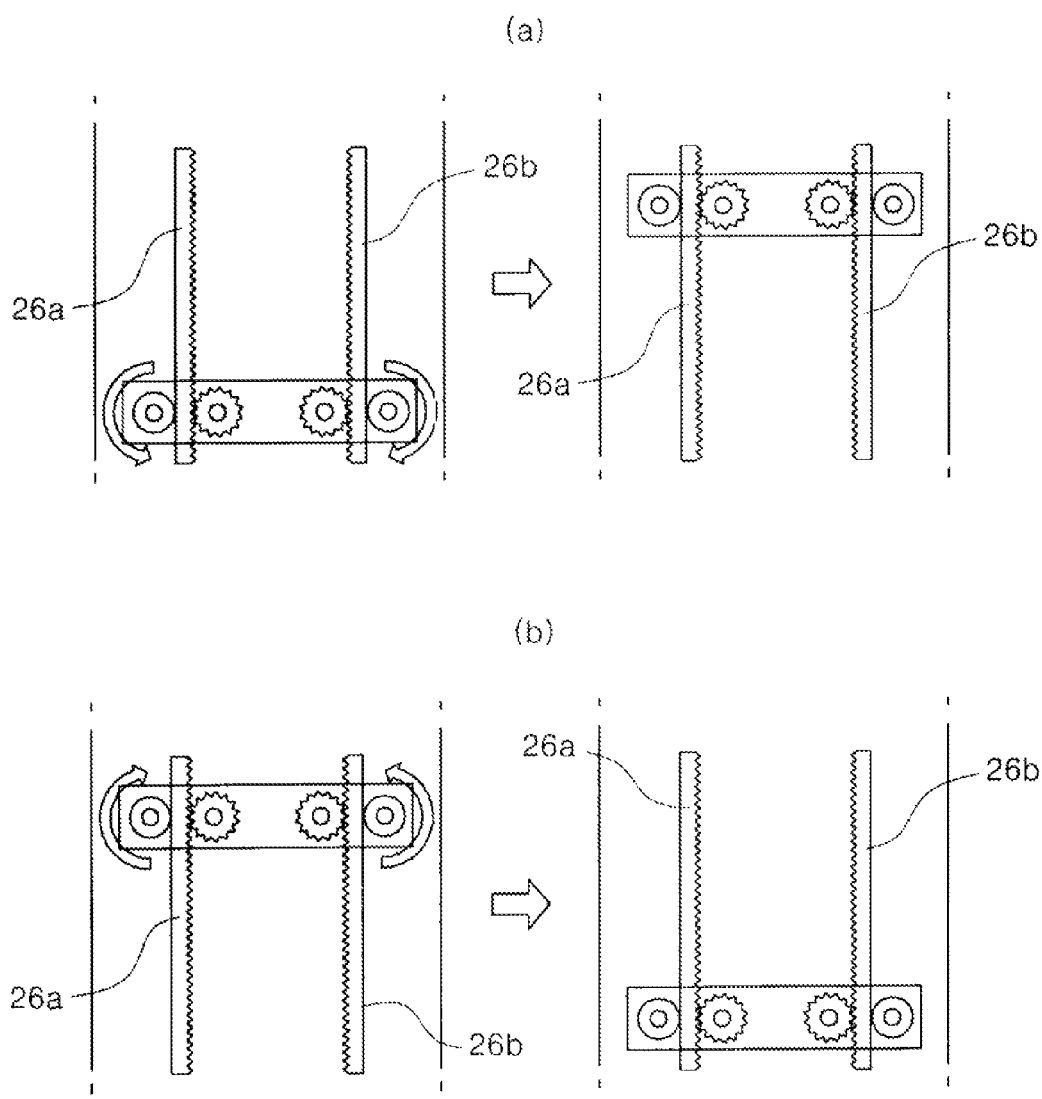
FIG. 12 is a conceptual view showing the operation of the flexible link mechanism for implementing the linear movement of FIG. 11.

By repeating the above-described step, the in-pipe inspection robot in accordance with the exemplary embodiment of the present invention can linearly move in the pipe, just as an inchworm moves. Moreover, as shown in FIG. 12, in implementing the linear movement, the inchworm motions are implemented by controlling the actuator such that the left flexible link 26a and the right flexible link 26b are moved in the longitudinal direction or in the reverse direction at the same time.

Figure 13:
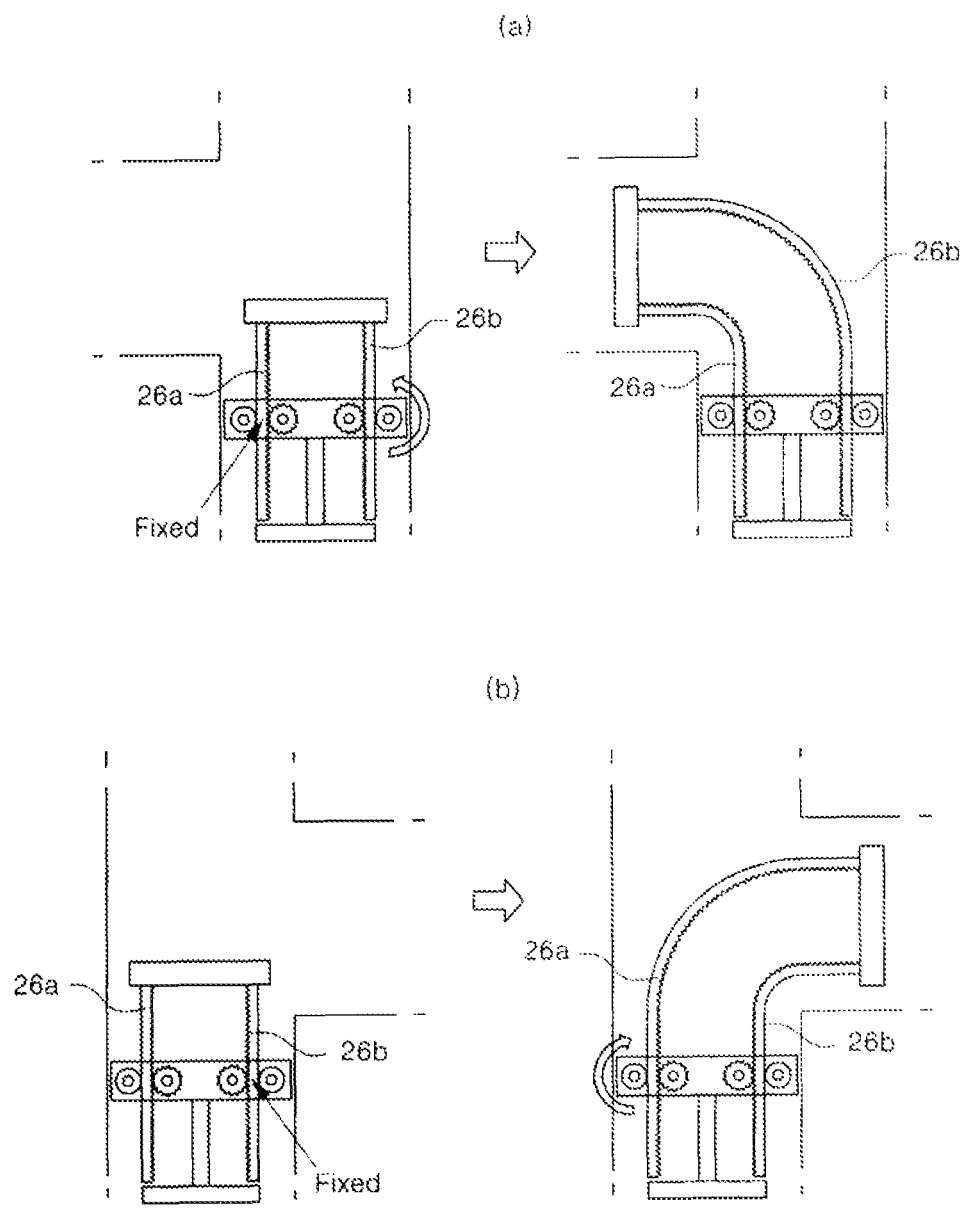
FIG. 13 is a conceptual view showing the operation of the flexible link mechanism based on movement in a T-shaped branch of the in-pipe inspection robot.

Meanwhile, FIG. 13 is a conceptual view showing the operation of the flexible link mechanism 2 based on the movement in a T-shaped branch of the in-pipe inspection robot. The sequential opening and closing operation of the arms 10 of the first operating unit 1a and the second operating unit 1b in the pipe is the same as the above-described linear movement. Moreover, the left or right movement of the robot in the branched section as shown in the figure can be implemented by controlling the actuator 20 such that one of the left and right flexible links 26a and 26b of the flexible link mechanism 2 is fixed and the other is moved.

As described above, the in-pipe inspection robot in accordance with the exemplary embodiment of the present invention can freely move in various types of pipes with curved sections, T-shaped, Y-shaped branches, etc. without regard to the shape of the pipe path by the sequential holding of the inner side of the pipe by means of the arms of the two operating units and by the control of the distance between the operating units and the curved angle of the operating units by means of the flexible link mechanism. Thus, the in-pipe inspection robot according to the present invention can be widely used in various industrial fields.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An in-pipe inspection robot which can move along a path in a pipe, characterized in that two or more operating units having a plurality of arms, which move forward and backward in a radial direction of the pipe, are connected to each other to move in a straight direction or to be bent relative to each other by means of a flexible link mechanism,
    wherein the flexible link mechanism comprises:
    an actuator;
    a flexible link made of a flexible material having a predetermined length, whose movement length is controlled by the actuator; and
    a mover spaced from the actuator and mounted on one free end of the flexible link, and
    wherein the flexible link comprises a pair of parallel left flexible links and a pair of right flexible links opposite to the left flexible links, the left flexible links and the right flexible links having mutually independent movements by two drive motors provided separately.

2. The in-pipe inspection robot of claim 1, wherein the plurality of arms provided on the same operating unit move the same length in the radial direction of the pipe at the same time and the arms provided on different operating units have mutually independent movements.

3. The in-pipe inspection robot of claim 2, wherein each of the operating units for moving the plurality of arms at the same time comprises a slider-crank mechanism, which includes a crank rotating with respect to a power transfer unit provided in the middle and a plurality of links bendably connected to ends of the crank and corresponding to the number of arms, such that when the crank rotates, each of the arms reciprocates along a slide shaft by each of the links and moves forward and backward in the radial direction of the pipe at the same time.

4. The in-pipe inspection robot of claim 1, wherein each of the plurality of arms comprises a foot for contact with a wall in the pipe and an elastic unit provided with an elastic body in the middle thereof for elastic pressure to the wall in the pipe.

5. The in-pipe inspection robot of claim 1, wherein the flexible link mechanism is rotatably connected to any one of the operating units with respect to a rotation axis along the longitudinal direction of the robot.

6. The in-pipe inspection robot of claim 1, wherein the flexible link is connected to the actuator in a rack & pinion manner such that the movement length of the flexible link is controlled.

7. The in-pipe inspection robot of claim 1, wherein the flexible link is an elastic bar.

8. The in-pipe inspection robot of claim 1, wherein the actuator comprises:
    two independent drive motors; and
    an electrically-driven unit transmitting the rotational power of the drive motors to the pair of left flexible links and the pair of right flexible links, respectively, as linear power.

9. The in-pipe inspection robot of claim 8, wherein the electrically-driven unit comprises:
    two independent left and right driven shafts which are each electrically connected to an output shaft of each of the drive motors;
    a pair of rack gears which are mounted on both ends of each of the driven shafts and transmit the rotational power each of the drive motors, transmitted to the driven shafts, to the pair of left flexible links or the pair of right flexible links; and
    a bracket which rotatably supports the left and right driven shafts having the rack gears.

10. The in-pipe inspection robot of claim 9, wherein the output shaft of each of the drive motors and the driven shaft of the electrically-driven unit are arranged to cross each other and electrically connected to each other by a pair of bevel gears.

11. The in-pipe inspection robot of claim 9, wherein the bracket further comprises a tensioner which is configured such that the pairs of left and right flexible links are not separated but in close contact with the corresponding rack gears in the engagement direction.

12. The in-pipe inspection robot of claim 11, wherein the tensioner comprises:

a pair of spaced adjustment blocks which are connected to both ends of the bracket by means of an adjustment member so as to adjust the distance to the end of the bracket;

a support shaft, of which both ends are supported on the adjustment blocks; and a roller which is rotatably mounted on the support shaft in a position that is in close contact with each flexible link.

13. The in-pipe inspection robot of claim 1, wherein the mover comprises a plurality of holders, to which one free end of the flexible link is fixed, and a rotating means which is provided on a body having the holders to implement the rotation of the operating unit with respect to the mover.

* * * * *